United States Patent Office 3,652,576
Patented Mar. 28, 1972

3,652,576
CERTAIN 1,2,3,6 OR 1,2,5,6-TETRAHYDRO-PYRIDINE INTERMEDIATES
Harry G. Pars, Lexington, and Raj K. Razdan, Belmont, Mass., assignors to Beecham Group Limited, Brentford, England
No Drawing. Application May 1, 1969, Ser. No. 821,125, which is a continuation-in-part of application Ser. No. 707,448, Feb. 23, 1968. Divided and this application Aug. 20, 1969, Ser. No. 862,140
Int. Cl. C07d 31/28
U.S. Cl. 260—297 R     9 Claims

ABSTRACT OF THE DISCLOSURE

Novel compounds having beneficial central nervous system activity and useful as analgesics are provided as well as their stereo- and geometric isomers, the compounds being 3,4,5,6 - tetrahydro - 2,6 - methano-2H-1,5-benzoxazocin derivatives and intermediates therefor and procedure for making the same. Typical compounds are 2,5-dimethyl - 3,4,5,6 - tetrahydro - 2,6-methano-2H-1,5-benzoxazocin-7-ol and 2,8-dimethyl-3,4,5,6 - tetrahydro-2,6-methano-2H-1,5-benzoxazocin. The compounds may be in the form of acid-addition salts and N-oxides and are formulated with the usual excipients or carriers into unit dosage form.

CROSS REFERENCE TO RELATED APPLICATIONS

This application is a divisional of our copending application, S.N. 821,125 filed May 1, 1969, now abandoned which in turn is a continuation-in-part of application S.N. 707,448, filed Feb. 23, 1968, now abandoned.

This invention relates to 3,4,5,6 - tetrahydro-2,6-methano-2H-1,5 - benzoxazocin derivatives having pharmacodynamic activity and to processes and intermediates for use in the preparation thereof. The invention is especially concerned with compounds having beneficial C.N.S. and analgesic activity.

Accordingly the present invention provides a compound of the formula:

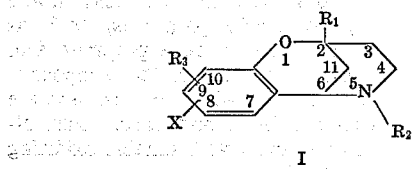

I or an acid addition salt or N-oxide thereof.

In Formula I and in formulae used subsequently herein and in the appended claims:
$R_1$ is H or lower alkyl having 1–6 carbon atoms,
$R_2$ is hydrogen, a substituted or unsubstituted hydrocarbon group of 1–24 carbon atoms, or an acyl group,
$R_3$ is hydrogen or a substituted or unsubstituted aliphatic or arylaliphatic hydrocarbon group of 1–24 carbon atoms, and
X is hydrogen or hydroxyl or an ester or ether derivative of the hydroxyl group.

Although the compounds of the present invention are represented herein by graphic formulas, the value of the invention does not depend upon the precise theoretical correctness of these formulas. Thus the invention is not limited to any specific tautomeric form or to any specific stereo- or geometric isomers.

The term lower alkyl as used herein includes straight and branched chain radicals such as methyl, ethyl, propyl, isopropyl, butyl, sec-butyl, amyl, hexyl and the like.

The term hydrocarbon group as used herein includes straight and branched chain saturated, unsaturated and cyclic aliphatic, aryl and combinations thereof. $R_2$ is for example a group such as alkyl, cycloalkyl of 3–8 carbon atoms, alkenyl, alkynyl, aryl and arylalkyl, e.g., methyl, n-amyl, sec-butyl, hexadecyl, cyclohexyl, cyclopropylmethyl, allyl, benzoyl, styryl, phenylethyl and the like.

The term aliphatic hydrocarbon group as used herein includes straight and branched chain saturated, unsaturated and cyclic (3–8 carbon atoms) groups. $R_3$ is for example methyl, dimethylheptyl, hexadecyl, allyl, cyclohexylmethyl and the like.

As indicated by the floating bonds in Formula I, the position of the groups $R_3$ and X in the benzene ring may vary. $R_3$ may for example occupy the 8 or 9 position and X the 7 or 10 position in the benzene ring.

The present invention also provides a process for the preparation of a compound of Formula I which comprises subjecting a compound of the formula:

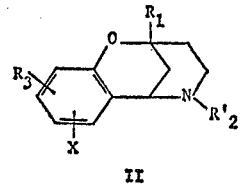

II where $R'_2$ is benzyl, to hydrogenolysis to convert the $R'_2$ group to hydrogen and optionally reacting the compound thus formed to replace the hydrogen with a group $R''_2$ where $R''_2$ is the same as $R_2$ except that it is not hydrogen or $R'_2$.

It will be understood that a variety of derivatives of the —NH group can be converted back into the basic —NH group and thence further derivatives of the —NH group produced.

Thus the —N-benzyl group is converted to the —NH group by reacting with hydrogen in the presence of a palladium/charcoal catalyst.

Further the —NH group so formed can be reacted with a variety of compounds such as acid derivatives to form derivatives of the —NH group. Thus a compound of the Formula IIa:

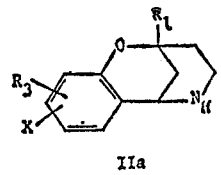

IIa may be reacted with, for example, an acetyl, benzoyl or alkyl halide to form the respective acetyl, benzoyl and alkyl derivatives.

Acyl derivatives such as phenacetyl, for example, may be reduced to the corresponding hydrocarbon groups by conversion of the carbonyl group to a methylene group. The phenacetyl group may be converted in this way to phenethyl for example by reacting with lithium aluminium hydride.

Thus a compound of the Formula IIa may be reacted with a compound of the formula $R''_2A$ where $R''_2$ is the same as $R_2$ except that it does not include hydrogen or benzyl and A is a radical which will enable the hydrogen of the NH group to be replaced by $R''_2$. It will be appreciated by those skilled in the art that a variety of chemical reactions may be used. For example A may be chlorine, bromine or iodine. The reagents should be chosen to give the desired tertiary amine product and the use of methyl iodide or any other alkyl halide or reactant which tends to give a quaternary salt should be avoided.

The present invention also provides an alternative method for the preparation of compounds of Formula I which comprises treating a compound of Formula III or an acid-addition salt with a strong acid:

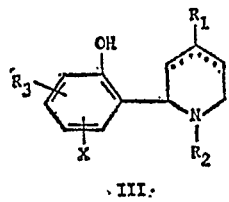

. III.

The dotted lines on either side of $R_1$ in the nitrogen-containing heterocycle indicate that the compound III is a mixture of isomers:

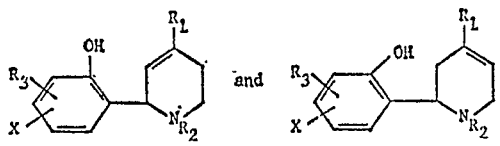

This convention is used in similar formulas throughout the present specification and claims.

The acid used may be mineral or organic for example sulphuric, hydrochloric or p-toluenesulphonic acid. The reaction is conveniently performed at elevated temperature, preferably at the boiling point of the reaction medium. An acid-addition salt is formed from which the free base may be liberated by treatment with another base.

The present invention also provides compounds of Formula III and acid-addition salts thereof. It will be clear to one skilled in the art that esterified and etherified derivatives of the OH group can also be made.

The present invention also provides a process for the production of a compound of Formula III which comprises treating a compound of the formula:

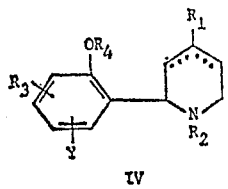

IV and acid-addition salts thereof to convert the —$OR_4$ group to a hydroxyl group, where $R_4$ is a stable protecting group for the hydroxyl radical and Y is hydrogen, hydroxyl or —$OR_4$.

Suitable protecting groups and methods for removing them are per se well known to those skilled in the art. $R_4$ may be, for example, methyl in which case a preferred method of removal is to react with $R_5MgZ$, where Z is bromine or iodine and $R_5$ is lower alkyl, at elevated temperature in an inert reaction medium followed by hydrolysis. The temperature should be over 100° C. and preferably 150–160° C. Hydrolysis is conveniently performed with dilute acid.

Alternatively $R_4$ may be 2-tetrahydropyranyl, for example, in which case it may be removed by treatment with acid alone.

The present invention also provides a compound of Formula IV and acid-addition salts thereof.

The present invention also provides a process for the preparation of compounds of Formula IV which comprises the partial hydrogenation of a compound of Formula V:

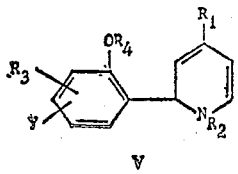

V

The preferred method of reduction is to use $MBH_4$ where M is an alkali metal, in an inert reaction medium, e.g., methanol, ethanol or aqueous mixtures. The reaction is conveniently performed at moderately elevated temperature, e.g., under reflux conditions and a base may be used, e.g., 2 N sodium hydroxide to stabilize the borohydride.

The present invention also provides compounds of Formula V and acid-addition salts thereof.

The present invention also provides a method for the preparation of compounds of Formula V which comprises reacting a compound of the Formula VI:

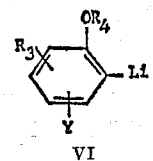

VI with a compound of the formula:

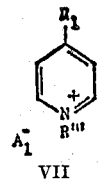

VII where $A_1^-$ is an anion preferably bromine, chlorine or iodine and $R'''_2$ is a group selected from $R_2$ as above defined and capable of forming part of a quaternary salt. $R'''_2$ is conveniently lower alkyl, arylalkyl (e.g. benzyl). The reaction is conveniently performed in an inert reaction medium e.g. ether.

Compounds VI and VII are made by conventional methods. Compound VII may, for example, be made by reacting a 4-lower alkyl pyridine with a lower alkyl halide. Compound VI may, for example, be made by reacting a suitable alkyl lithium (e.g. n-butyl lithium) with an alkoxy resorcinol, wherein the alkoxy group is $OR_4$.

The acid addition salts of the present invention may be made by conventional means, for example, by reacting the free base with an appropriate acid. If the compound is intended for pharmaceutical use, then the acid should have pharmaceutically acceptable properties, such as relatively low toxicity. By choosing an appropriate acid the physical form, solubility or taste of the compounds may be varied. Examples of acids which may be used are HCl, HBr, HI, phosphoric, lactic and citric acids. N-oxides may be made by treatment with suitable oxidizing agents, e.g., hydrogen peroxide.

Various derivatives of the hydroxyl substituted compounds of the present invention may also be made by conventional means, by replacing the hydrogen of the OH radical with etherifying or esterifying substituents such as acetyl, lower alkyl, phosphate, diaalkylaminoalkyl and the like.

The compounds of Formula I have been found to possess beneficial central nervous system activity, and in particular analgesic activity. This is evidenced by activity in the D'Armour-Smith test upon parenteral administration in mice, which is an indication of their usefulness as analgesics. Compounds of Formula III have also shown beneficial CNS activity.

The compounds of the present invention may be administered orally or parenterally and are preferably incorporated into a pharmaceutical formulation for such administration, either as the sole active ingredient or together with other pharmacologically active ingredients. For example, the oral preparations may be tablets, pills, powders, capsules, granules, suspensions, dispersions, solutions or emulsions which may contain diluents, binders, dispersing agents, coloring agents, coating materials, solvents, thickening agents or any other pharmaceutically acceptable additives wherever appropriate. Thus the compounds can be incorporated in unit dosage form as tablets or capsules for oral administration either alone or in combination with suitable adjuvants such as calcium carbonate, starch, lactose, talc, magnesium stearate, gum acacia, and the like or they can be formulated for oral administration in aqueous alcohol, glycol or oil solutions or oil-water emulsions in the same manner as conventional medicinal substances are prepared. The injectable form may be a substantially aqueous or non-aqueous solution, suspension or emulsion in a pharmaceutically acceptable liquid or mixture of liquids which may contain bacteriostats, anti-oxidants, buffers, solutes to render the formulation isotonic with the blood, thickening agents, suspending agents, or any other pharmaceutically acceptable additives where appropriate. Such injectable formulations should be made sterile and may be presented in unit dose forms such as ampoules or disposable injection devices or in multi-dose forms such as bottles from which the appropriate dose may be withdrawn. The compounds can, for example, be prepared for use by dissolving under sterile conditions a salt form of the compounds in water (or an equivalent amount of a non-toxic acid) or in a physiologically compatible aqueous medium such as saline, and stored in ampoules for intramuscular injection.

The molecular structures of the compounds of the invention were assigned on the basic of a study of their infrared, ultraviolet and NMR spectra, of mass spectrometry and their transformation products and they were confirmed by the correspondence of calculated and found values for the elementary analyses for representative examples.

The following examples will further illustrate the invention without, however, limiting it thereto.

EXAMPLE 1

1,2-dihydro-2-(2,6-dimethoxyphenyl)-1,4-dimethylpyridine 24 grams of 1,4-dimethylpyridinum iodide (prepared from 14.4 grams of 4-methyl-pyridine and 42.9 grams of methyl iodide in 200 ml. of ether) was added to 2,6-dimethoxyphenyllithium (prepared from 11.82 grams of n-butyl-lithium and 21.4 grams of dimethoxy resorcinol) in ether (200 ml.). The solution was set aside for 18 hours and then was refluxed for 2 hours. The solution was decomposed with water and extracted with ether. The ether extract was washed several times with water, dried and evaporated to leave 20.8 grams of 1,2-dihydro-2-(2,6-dimethoxyphenyl)-1,4-dimethylpyridine as a reddish liquid. This material was used without further purification in the following example.

EXAMPLE 2

2-(2,6-dimethoxyphenyl) - 1,4 - dimethyl-1,2,5,6-tetrahydropyridine and 2-(2,6-dimethoxyphenyl)-1,4-dimethyl-1,2,3,6-tetrahydropyridine To a solution of 20.8 grams of the 1,2-dihydro-2-(2,6-dimethoxyphenyl) - 1,4 - dimethylpyridine formed in Example 1 in 100 ml. of methanol containing 50 ml. of 2 N sodium hydroxide was added 4.5 grams of sodium borohydride, and the solution was stirred at room temperature overnight. After refluxing for one hour, the solution was cooled and decomposed with water. The aqueous solution was made acidic with dilute HCl and extracted with ether. The resulting extracted solution was then made alkaline with dilute NaOH and extracted several times with ether. Evaporation of the ether gave 16.3 grams of a mixture of the tetrahydropyridines as a dark yellow liquid; m/e 247.

Analysis.—Calcd. for $C_{15}H_{21}NO_2$ (percent): C, 72.84; H, 8.56; N, 5.66. Found (percent): C, 72.70; H, 8.60; N, 6.08.

EXAMPLE 3

2-(1,4-dimethyl-1,2,5,6 - tetrahydropyridinyl)-resorcinol and 2-(1,4-dimethyl-1,2,3,6-tetrahydropyridinyl)-resorcinol To a Grignard reagent [formed by mixing 2.4 grams of magnesium and 14.3 grams of methyl iodide in 100 ml. of anhydrous ether] was added 2 grams of the mixture of 2-(2,6-dimethoxyphenyl)-1,4-dimethyl-1,2,5,6-tetrahydropyridine and 2-(2,6-dimethoxyphenyl)-1,4-dimethyl-1,2,3,6-tetrahydropyridine of Example 2 in 40 ml. ether. The mixture was heated in an oil bath at 150–160° for 1.5 hours. The cooled reaction mixture was treated with dilute acid and ether. The ether layer was discarded and the aqueous layer was neutralized with sodium hydroxide and extracted with chloroform. The chloroform extract was washed with saturated sodium chloride, dried and evaporated to leave 0.8 gram of a brown gum. It was chromatographed on a column of silica gel (30 grams). Elution with chloroform gave 0.6 gram of a mixture of 2-(1,4-dimethyl-1,2,5,6-tetrahydro-2-pyridinyl)-resorcinol and 2-(1,4-dimethyl-1,2,3,6-tetrahydro-2-pyridinyl)-resorcinol. NMR ($CDCl_3$) confirmed the assigned structures. It gave a positive ferric chloride test and was soluble in dilute sodium hydroxide solution. This material was used without further purification in the following step.

EXAMPLE 4

2,5-dimethyl-3,4,5,6-tetrahydro-2,6-methano-2H-1,5-benzoxazocin-7-ol

A solution of 0.4 gram of a mixture of the product 2-(1,4-dimethyl-1,2,5,6 - tetrahydro-2 - pyridinyl)-resorcinol and 2-(1,4-dimethyl-1,2,3,6-tetrahydro-2-pyridinyl)-resorcinol in 10 ml. of concentrated hydrochloric acid was boiled for 1 hour on a waterbath. The solution was cooled and was neutralized to pH 7 with 10% sodium hydroxide solution and extracted with chloroform (2× 100 ml.). The combined chloroform extract was washed with saturated sodium chloride, dried and evaporated to leave 0.38 gram of brown gum. It was chromatographed on a column of silica gel (20 grams) and eluted with chloroform, chloroform/methanol mixture and finally with methanol. The methanol eluent was combined and evaporated to give 0.18 gram of benzoxazocin as a dark brown froth; m/e 219.

Analysis.—Calcd. for $C_{13}H_{17}NO_2H_2O$ (percent): C, 65.80; H, 8.07; N, 5.90. Found (percent): C, 65.74; H, 7.61; N, 5.86.

NMR ($CDCl_3$) confirmed the assigned structure. It showed ultraviolet absorption at 280 m$\mu$, $\lambda_{max.}^{EtOH}$ 2000

EXAMPLE 5

2-(p-tolyloxy)tetrahydropyran

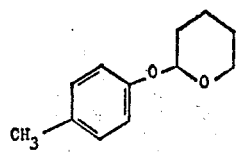

p-cresol (54 g.; 0.5 mole) was added dropwise to a mixture of 90 ml. (1 mole) of dihydropyran and several drops of concentrated hydrochloric acid at 15–25° with stirring. The mixture was stirred for 2–3 hours at room temperature after the addition was over and the mixture extracted with ether. The ether extract was washed with 10% aqueous sodium hydroxide, water, saturated aqueous saline solution and dried over anhydrous sodium sulfate. The solution was filtered, and the filtrate evaporated to dryness. Distillation of the product gave 60.3 g. (62.5%) of 2-(p-tolyloxy)tetrahydropyran, B.P. 98–100°/2–3 mm., $n_D^{25}$, 1.5148. A forerun of 11.2 g. was collected at 86–98°/1 mm., $n_D^{25}$, 1.5050.

EXAMPLE 6

1-benzyl-2,(2-hydroxy-5-methylphenyl)-4 - methyl-1,2,5, 6-tetrahydropyridine and 2-(2-hydroxy-5-methylphenyl)-1-benzyl-4-methyl-1,2,3,6-tetrahydropyridine

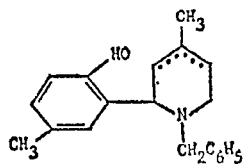

A solution of 9.6 g. (0.050 mole) of the pyranyl compound of Example 5 in 30 ml. of dry ether was added dropwise to a solution of 20 ml. (0.047 mole) (22.0 wt. percent; 2.35 M in hexane) of n-butyl lithium in an equal volume of ether. The mixture was refluxed for 32 hours.

Simultaneously, 40 g. (0.234 mole) of benzyl bromide in 30 ml. of dry ether was added dropwise to 10.5 g. (0.112 mole) of 4-picoline in an equal volume of ether. The quaternary salt precipitated slowly, and the mixture was allowed to stir overnight at room temperature. The N-benzyl quaternary salt was filtered, washed thoroughly with ether and dried. The salt was added in bulk to the lithium adduct at ice temperature and the mixture was allowed to stir at room temperature overnight. The solution was refluxed for 45 min., cooled and diluted with an equal volume of water. The ether layer was separated, extracted with water, dried and evaporated to give a dark viscous oil. The oil was dissolved in a mixture of 120 ml. of methanol and 40 ml. of 2 N aqueous sodium hydroxide solution. Then 3.2 g. (0.085 mole) of sodium borohydride was added all at once and the mixture was heated at 55–60° for 2 hours. After stirring overnight at room temperature, the solution was refluxed for 45 min., cooled and the volatiles removed under reduced pressure. The residue was diluted with water and extracted with ether. The ether solution was then extracted wtih 1:1 hydrochloric acid and the acid solution extracted further with ether to remove neutral fractions. The acid solution was heated on the steam bath for 10–15 min., cooled and an equal volume of chloroform was added. The mixture was neutralized to a pH of 4–5 with aqueous sodium hydroxide and then to a pH of 8 with solid potassium bicarbonate. The chloroform solution was separated, washed with aqueous potassium bicarbonate, water and dried. The black solution was filtered and evaporated to dryness to give 5.3 g. (28%) of a black, viscous oil. The crude product was passed through a silicic acid column (1" x 18") with chloroform to give 2.8 g. (15%) of the desired product as a viscous, yellow oil. NMR (CDCl₃) confirmed the desired structure.

EXAMPLE 7

5-benzyl-2,8-dimethyl-3,4,5,6-tetrahydromethano-2H-1,5-benzoxazocin

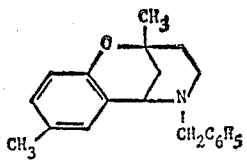

A mixture of 2.3 g. (0.0078 mole) of the intermediate of Example 6 and 30 ml. of concentrated hydrochloric acid was heated in a sealed glass tube at 110° for 2 hours. The mixture was cooled and an equal volume of chloroform was added. The chloroform-acid mixture was made basic with aqueous sodium hydroxide and the chloroform solution was separated. The aqueous phase was extracted with chloroform and the combined chloroform solution was washed with water and dried. The organic solution was filtered, and evaporated to dryness to yield 2.3 g. (100%) of a crude dark gum. A small sample of this material (500 mg.) was passed through a silicic acid column (0.75" x 0.75") with chloroform to give 200 mg. (50%) of the desired product. NMR (CDCl₃) confirmed the assigned structure.

EXAMPLE 8

2,8-dimethyl-3,4,5,6-tetrahydro-2,6-methano-2H-1,5-benzoxazocin

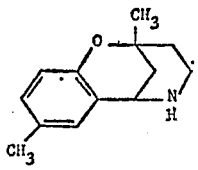

A solution of 1.13 g. (0.0038 mole) of the crude benzylated product of Example 7 in a mixture of 100 ml. of absolute alcohol and 20 ml. of glacial acetic acid was shaken with 0.5 g. of 10% palladium-on-charcoal at a hydrogen pressure of 57.5 lbs. overnight. The mixture was filtered and evaporated to dryness. The residue was dissolved in chloroform, shaken with aqueous potassium bicarbonate, washed with water, dried and evaporated to yield 0.58 g. (75%) of a gummy solid. Recrystallization from cyclohexane gave the desired product, M.P. 104–104.5° as light yellow crystals. Sublimation of the crude material furnished a colorless crystalline solid when done at 40–70° at about 0.1 mm., M.P. 105–105.5°. The overall yield of the final product from the pyranyl p-cresol was 7.5%.

Analysis.—Calcd. for $C_{13}H_{17}NO$ (percent): C, 76.81; H, 8.43; N, 6.89. Found (percent): C, 77.13; H, 8.33; N, 6.81.

NMR (CDCl₃) confirmed the assigned structure.

EXAMPLE 9

6-(tetrahydro-2-pyranyloxy)-o-cresol

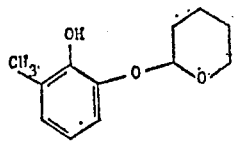

Solid 3-methylcatechol (62 g.; 0.5 mole) was added with cooling to 180 ml. of dihydropyran containing a few drops of concentrated hydrochloric acid. The mixture was stirred at room temperature for 2–3 hours, dissolved in ether and the ether solution washed with dilute aqueous sodium hydroxide and water. After drying, the ether solution was evaporated and the residue was distilled to give 50 g. (48%) of a colorless liquid, B.P. 125–130°/1–2 mm. $n_D^{26}$, 1.5230.

EXAMPLE 10

1-benzyl-2-(2,3 - dihydroxy 4-methylphenyl) - 4 - methyl-1,2,5,6 - tetrahydropyridine and 1 - benzyl-2-(2,3-dihydroxy - 4 - methylphenyl)-4-methyl-1,2,3,6-tetrahydropyridine

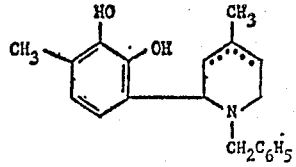

A mixture of 10.4 g. (0.05 mole) of the pyranyl derivative of Example 9, 40 ml. (0.095 mole) (22 wt. percent; 2.35 M) of n-butyl lithium in hexane and 100 ml. of dry ether was refluxed for 16 hours.

Simultaneously a solution of 40 g. (0.234 mole) of benzyl bromide in 30 ml. of dry ether was added dropwise to 10.5 g. (0.112 mole) of 4-picoline in an equal volume of ether and the mixture was allowed to stir at room temperature overnight. The quaternary salt was filtered, washed with ether, dry, and added in bulk to the lithio derivative above. The mixture was stirred at room temperature for 30 hrs. Water was added and the ether solution was separated. The aqueous phase was extracted with ether and the combined ether solution was dried and evaporated to yield 5.2 g. (33%) of a black oil.

A solution of 4.7 g. (0.015 mole) of the crude oil in 90 ml. of methanol and 40 ml. of 2 N aqueous sodium hydroxide was treated with 3.2 g. (0.085 mole) of sodium borohydride and the mixture stirred at room temperature for a few minutes and then at 55–65° for 2 hours. It was then stirred at room temperature overnight and followed by refluxing for 1 hour. The solution was evaporated to remove volatiles and the residue diluted with water. The crude mixture was extracted with ether and the ether solution was extracted with 1:1 hydrochloric acid. The acid solution was extracted with ether to remove neutrals and then heated on the steam bath for several minutes. Chloroform was added to the cooled acid solution and the mixture was neutralized to a pH of 4–5 with aqueous alkali and then to a pH of 8 with solid potassium bicarbonate. The chloroform solution was separated and the aqueous phase was extracted with more chloroform. The combined chloroform extract was shaken 2 or 3 times with aqueous potassium bicarbonate, water and dried. Filtration and evaporation of the solution gave 2.5 g. (16.5%) of a black gum. All of this material was passed through a silicic acid column with 1% methanol in chloroform to five 0.89 g. (6.5%) of a viscous, yellow gum. The structure of this material was confirmed by NMR and infrared spectra.

EXAMPLE 11

5-benzyl-2,9-dimethyl-3,4,5,6-tetrahydro-2,6-methano-2H-1,5-benzoxazocin-10-ol

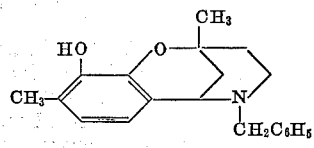

All of this sample was heated in 20 ml. of concentrated hydrochloric acid for 2½–3 hours in a sealed glass tube at 110°, cooled, diluted with water and with chloroform. The mixture was neutralized to about a pH of 5 with 55 ml. of 2 N sodium hydroxide and then to a pH of 8 with solid potassium bicarbonate. The chloroform phase was separated, shaken with more aqueous bicarbonate, water, and dried. The solution was evaporated to dryness and the black, viscous oil was passed through a silicic acid column (10" x 1⅜") using chloroform. After 700–800 ml. of eluate was collected, a band was eluted in the next 200 ml. of eluate to give 0.2–0.4 g. (1–3% overall) of the desired compound. NMR and infrared spectra confirmed the structure.

EXAMPLE 12

A compound of formula:

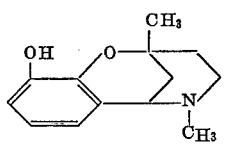

was made by a process closely similar to that described in Examples 9–11 using appropriate starting materials.
The melting point was 169–171°.

EXAMPLE 13

A compound of formula:

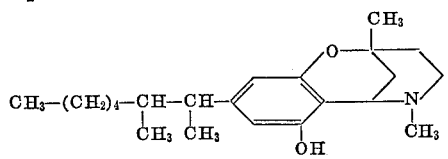

was made by a process closely similar to that described in Examples 9–11 using appropriate starting materials.
The melting point was 185–187° C.

EXAMPLE 14

3,4,5,6-tetrahydro-1,5,8-trimethyl-2,6-2H-1,5-benzoxazocin

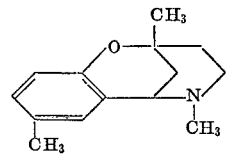

A solution of 28.8 g. (0.15 mole) of 2-(p-tolyloxy) tetrahydropyran in 90 ml. of ether was added to 63 ml. (0.15 mole) (21.1%, 2.1 M in hexane) of n-butyl lithium in an equal volume of ether. The mixture was refluxed for about 30 hrs.

Simultaneously 100 g. (0.70 mole) of methyl iodide in 60 ml. of ether was added to 31.5 g. (0.336 mole) of 4-picoline in about 300 ml. of ether. The mixture was stirred overnight at room temperature. The N-methyl quaternary salt was filtered, washed thoroughly with ether and dried. The salt was added in bulk to the lithium adduct at ice temperature and the mixture was allowed to stir at room temperature for 2 days. The solution was refluxed for 1 hr., cooled and diluted with water. The ether layer was separated and the aqueous layer was extracted several times with ether. The combined ether solution was washed with water, dried and evaporated to give 29 g. of a dark, viscous oil. The oil was dissolved in a mixture of 350 ml. of methanol and 120 ml. of 2 N aqueous sodium hydroxide solution. Then 9.6 g. (0.255 mole) of sodium borohydride was added and the mixture was heated at 50–60° for 2 hrs. After stirring overnight at room temperature, the solution was refluxed for 1 hr., cooled, and the volatiles evaporated under reduced pressure. The residue was diluted with water and extracted with ether. The ether solution was then extracted with 1:1 hydrochloric acid and the acid solution was extracted further with ether to remove neutral fractions. The acid solution was heated on the steam bath for 10–15 min., cooled, and an equal volume of chloroform was added. The mixture was neutralized with aqueous sodium hydroxide to a pH of 4 and then with solid potassium bicarbonate to a pH of 8. The chloroform solution was separated and the aqueous phase was further extracted with chloroform. The combined chloroform solution was washed further with aqueous potassium bicarbonate, water, and then dried. The solution was filtered and evaporated to dryness to give 13 g. (40%) of a dark, viscous oil.

Half (6.5 g.; 0.03 mole) of the tetrahydropyridine adduct above was dissolved in 150 ml. of concentrated hydrochloric acid and heated in a sealed glass tube at 110° for 2 hrs. The mixture was allowed to stand overnight at room temperature, then cooled in ice and the tube opened. Chloroform was added to the tube and the mixture was made basic with aqueous sodium hydroxide. The chloroform layer was separated, washed with aqueous potassium bicarbonate, water, and dried. The dark solution was concentrated and passed through a silicic acid column (1" x 35") with chloroform to give 1.9 g. (29%) of the crude product. Sublimation at 50–100°/0.1 mm. gave colorless crystals, M.P. 62–63". Yield was 0.66 g.

Analysis.—Calcd. for $C_{14}H_{19}NO$ (percent): C, 77.38; H, 8.81; N, 6.45. Found (percent): C, 77.36; H, 8.79; N, 6.44.

NMR confirmed the structure.

EXAMPLE 15

2,8-dimethyl-5-(2-phenethyl)-3,4,5,6-tetrahydro-2,6-methano-2H-1,5-benzoxazocin hydrochloride

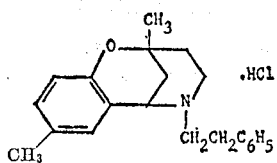

A solution of 1.54 g. (10 mmoles) of phenylacetyl chloride in 15 ml. of dry benzene was added dropwise to a solution of 1 g. (4.9 mmoles) of the nor base (2,8-dimethyl - 3,4,5,6 - tetrahydro - 2,6-methano-2H-benzoxazocin) in a mixture of 7 ml. of dry pyridine and 5 ml. of dry benzene. The mixture was refluxed for 3 hrs. and allowed to stand overnight at room temperature. The mixture was diluted with water to dissolve the precipitated pyridine hydrochloride and extracted with methylene chloride. The extract was washed with aqueous potassium bicarbonate, water, saline solution, and dried. The solution was filtered and evaporated to give a dark oil. The crude oil was dissolved in ether and the ether solution was added to a mixture of 1.5 g. of lithium aluminum hydride and 20 ml. of dry ether. Refluxing occurred during the addition and the mixture was then refluxed overnight with stirring. The solution was cooled in ice and carefully decomposed with water. The ether phase was dried and evaporated to yield a viscous gum. The crude product was extracted with boiling cyclohexane, filtered, and the filtrate was diluted with ether. The solution was carefully made acidic with ethereal hydrogen chloride and the salt was collected to yield 0.99 g. (59%). The material sublimed at 150–180° at about 0.1 mm. with a recovery of about 75%, M.P. 255° (softening and slow sublimation beginning at 245°).

*Analysis.*—Calcd for $C_{21}H_{26}ClNO$ (percent): C, 73.35; H, 7.62; N, 4.07; Cl, 10.31. Found (percent): C, 73.40; H, 7.56; N, 4.06; Cl, 10.38.

NMR confirmed the assigned structure.

What is claimed is:

1. A compound of the formula:

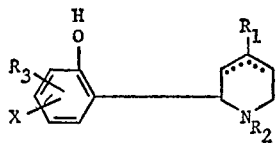

or an acid-addition salt thereof, wherein $R_1$ is lower alkyl, $R_2$ is hydrogen, acetyl, phenacetyl or benzoyl, lower alkyl or benzyl, $R_3$ is hydrogen or lower alkyl, and X is hydrogen or hydroxyl or an ester or ether of the hydroxyl with a proviso, that when X is other than hydrogen or hydroxyl, $R_3$ is hydrogen.

2. A compound of the formula:

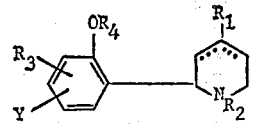

or an acid-addition salt thereof, wherein $R_1$, $R_2$, and $R_3$ have the meanings set forth in claim 1, Y is hydrogen, hydroxyl or $OR_4$ and $R_4$ is the hydroxyl group, $R_3$ being in the 8- or 9-position and Y when not hydrogen being in the 7- or 10-position in the benzene ring.

3. A compound of the formula:

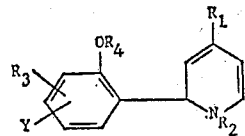

or an acid-addition salt thereof, wherein $R_1$, $R_2$, $R_3$, $R_4$ and Y have the meanings set forth in claim 2.

4. The compound which is 1,2-dihydro-2-(2,6-dimethoxyphenyl)1,4-dimethylpyridine.

5. The compound 2 - (2,6-dimethoxyphenyl) - 1,4-dimethyl-1,2,5,6-tetrahydropyridine or 2-(2,6-dimethoxyphenyl)-1,4-dimethyl-1,2,3,6-tetrahydropyridine.

6. The compound 2-(1,4-dimethyl-1,2,5,6-tetrahydropyridinyl)-resorcinol or 2-(1,4-dimethyl-1,2,3,6-tetrahydropyridinyl)-resorcinol.

7. The compound 1-benzyl-2-(2,3-dihydroxy-4-methylphenyl)-4-methyl-1,2,5,6-tetrahydropyridine.

8. The compound 1-benzyl-2-(2,3-dihydroxy-4-methylphenyl)-4-methyl-1,2,3,6-tetrahydropyridine.

9. The compound 1-benzyl-2-(2-hydroxy-5-methylphenyl)-4-methyl-1,2,5,6-tetrahydropyridine or 2-(2-hydroxy-5-methylphenyl)-1-benzyl-4-methyl-1,2,3,6-tetrahydropyridine.

References Cited
UNITED STATES PATENTS

| | | | |
|---|---|---|---|
| 3,093,650 | 6/1963 | Fry et al. | 260—297 |
| 3,073,837 | 1/1963 | Rivard | 260—297 |

ALAN L. ROTMAN, Primary Examiner

U.S. Cl. X.R.

260—294.7 C, 295 S, 295 R